(12) United States Patent
Witt

(10) Patent No.: US 6,598,982 B2
(45) Date of Patent: Jul. 29, 2003

(54) REARVIEW MIRROR ALIGNMENT DEVICE

(75) Inventor: Frank A. Witt, Charleston, SC (US)

(73) Assignee: Donnelly Corporation, Holland, MI (US)

(*) Notice: Subject to any disclaimer, the term of this patent is extended or adjusted under 35 U.S.C. 154(b) by 0 days.

(21) Appl. No.: 09/872,501

(22) Filed: Jun. 1, 2001

(65) Prior Publication Data

US 2002/0048094 A1 Apr. 25, 2002

Related U.S. Application Data

(60) Provisional application No. 60/208,804, filed on Jun. 2, 2000.

(51) Int. Cl.[7] .................. G02B 5/08; G02B 7/182; B60R 1/04; B60R 1/06; B60Q 1/26
(52) U.S. Cl. .................. 359/839; 359/872; 362/494; 362/142; 362/800; 33/264; 33/286
(58) Field of Search .................. 359/838, 839, 359/843, 872, 877; 362/494, 142, 800; 33/264, 286

(56) References Cited

U.S. PATENT DOCUMENTS

| | | | | |
|---|---|---|---|---|
| 3,565,566 A | * | 2/1971 | Wetzel | |
| 4,678,294 A | * | 7/1987 | Van Nostrand | |
| 4,730,926 A | * | 3/1988 | Wedemeyer | |
| 4,882,565 A | * | 11/1989 | Gallmeyer | |
| 4,971,430 A | * | 11/1990 | Lynas | |
| 5,022,747 A | * | 6/1991 | Polanyi et al. | |
| 5,237,458 A | * | 8/1993 | Polanyi et al. | |
| 5,313,335 A | * | 5/1994 | Gray et al. | |
| 5,416,313 A | * | 5/1995 | Larson et al. | |
| 5,481,409 A | * | 1/1996 | Roberts | |
| 5,500,773 A | * | 3/1996 | Easter | |
| 5,786,772 A | * | 7/1998 | Schofield et al. | |
| 5,969,870 A | * | 10/1999 | Jain et al. | |
| 6,056,411 A | * | 5/2000 | Blevins | |
| 6,170,956 B1 | * | 1/2001 | Rumsey et al. | |
| 6,176,587 B1 | * | 1/2001 | Fredricks | |

* cited by examiner

Primary Examiner—Ricky D. Shafer
(74) Attorney, Agent, or Firm—Van Dyke, Gardner, Linn & Burkhart, LLP

(57) ABSTRACT

An alignment device for a rearview mirror assembly of a vehicle provides a visible signal or indication to a driver of the vehicle to assist the driver in aligning the rearview mirror assembly for proper rearward and/or sideward viewing. The alignment device is adaptable for interior and exterior rearview mirror assemblies. Preferably, the alignment device includes an illumination source positioned at or near the reflective element of the rearview mirror assembly. The illumination source is actuatable to provide the visible signal during an adjustment period of the rearview mirror assembly and may be deactivated following such time period.

28 Claims, 4 Drawing Sheets

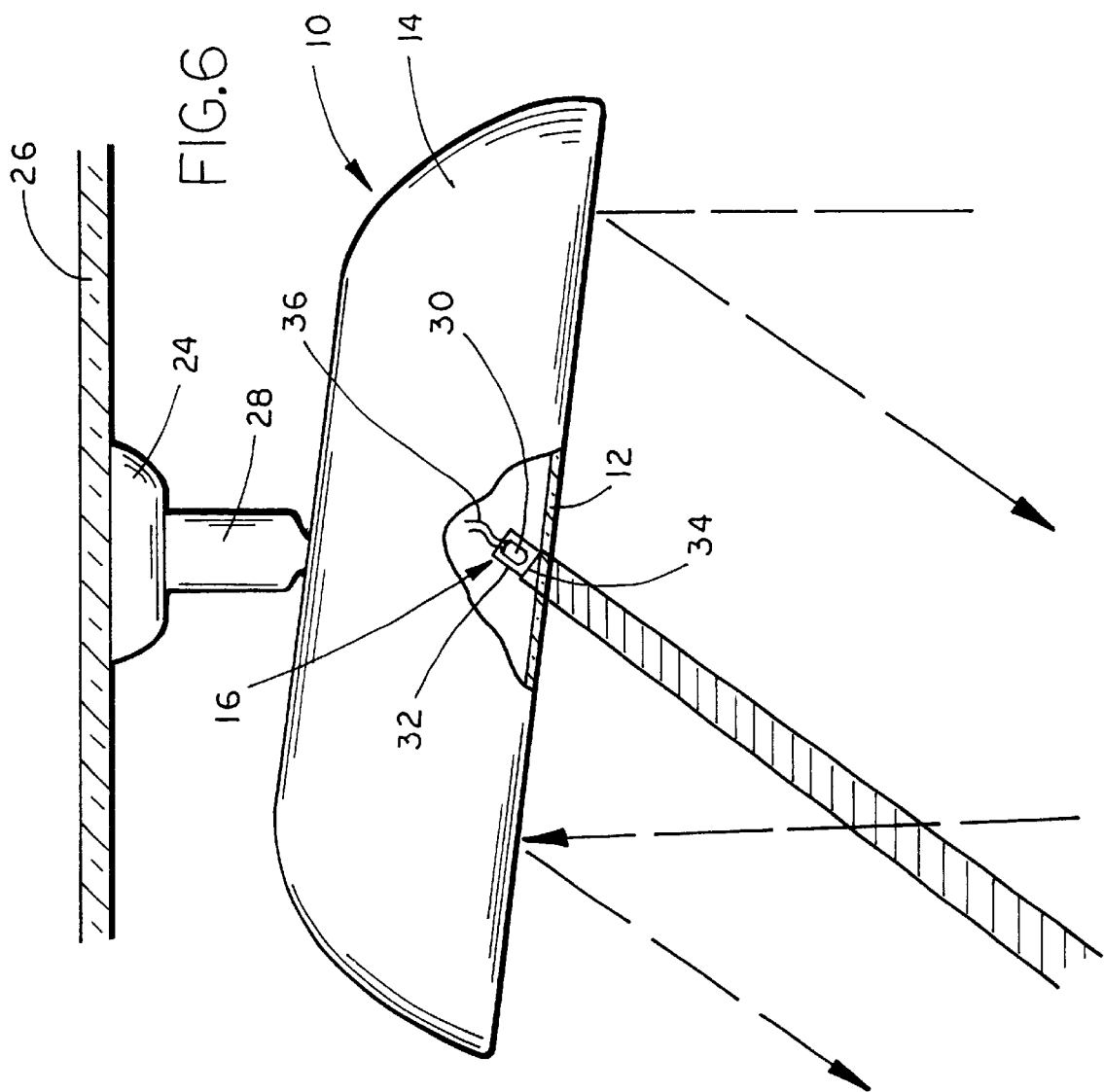

REARVIEW MIRROR ALIGNMENT DEVICE

CROSS-REFERENCE TO RELATED APPLICATION

This application claims priority from U.S. Provisional Application, Ser. No. 60/208,804, filed Jun. 2, 2000 by Frank Witt for REARVIEW MIRROR ALIGNMENT DEVICE, which is hereby incorporated herein by reference in its entirety.

FIELD OF THE INVENTION

This invention relates generally to rearview mirrors for vehicles and, more particularly, to a device for ensuring an appropriate orientation of the rearview mirror relative to the driver of the vehicle.

BACKGROUND OF THE INVENTION

Vehicles are designed to accommodate many different drivers of various sizes. However, each time a new driver drives a vehicle, the new driver typically first has to adjust the reflective element of the rearview mirror assemblies on the vehicle (the mirror assemblies typically comprise an interior rearview mirror assembly and a least one, and typically two, exterior side view mirror assemblies) to properly adjust the driver's rearward field of view, since the height of the driver and seat position may change between drivers, which often results in the mirrors being misaligned for the next driver.

Therefore, the mirrors of vehicles are often being adjusted by the drivers, especially if one car is used by two or more family members. When adjusting the interior rearview mirror assembly, the interior rearview mirror reflective element may be aligned with the rear window aperture to provide proper rearward viewing through the rear window. However, this may be difficult for some vehicles or in certain lighting conditions, such as convertibles, and/or during nighttime conditions, where the rear window aperture is less visible to the driver.

Additionally, the reflective elements of exterior rearview mirrors mounted on the outside of the vehicle may be difficult to adjust for optimal and safe rearward viewing by the driver of the vehicle, and especially for flat mirror reflective elements. If the mirror is adjusted too far outwardly such that a portion of the side of the vehicle is not viewable by the driver, then the driver may not be aware of the degree at which the mirror is adjusted relative to the vehicle. Typically, drivers adjust the exterior mirror reflective element to include a reference point along the side of the vehicle within their field of view, which results in a field of view that is too far inwardly toward the vehicle. Also, if the mirror reflective element is adjusted too far inwardly such that a larger portion of the side of the vehicle is viewable, this may result in a significant blind spot for the driver. This is especially applicable to the driver's side exterior rearview mirror, which, in the United States, is a flat/planar mirror, which typically provides only about a 15 degree or less field of view to the driver, potentially leaving a blind spot in the driver's rearward field of view, particularly when the mirror reflective element is adjusted too far inwardly towards the side body of the vehicle.

Accordingly, there is a need for a mirror alignment device which is operable to provide assistance to a driver of a vehicle in achieving an appropriate orientation of either or both of the interior or exterior rearview mirror or mirrors relative to the driver, such that the driver has an optimal and safe rearward field of view. The alignment device would adapt to drivers of various sizes and may be adapted for both interior and exterior rearview mirror assemblies.

SUMMARY OF THE INVENTION

The present invention is intended to provide a rearview mirror alignment device which is operable to provide a driver of a vehicle with a visible indication or signal which communicates to the driver when the rearview mirror assembly is properly aligned for optimal and safe rearward viewing. The alignment device is adaptable for interior rearview mirror assemblies and exterior rearview mirror assemblies.

According to a first aspect of the present invention, a rearview mirror assembly for a vehicle comprises an adjustably positioned reflective element, a support and an optically-sighted mirror alignment device. The alignment device is operable to provide a visual indication or signal to a driver of the vehicle when the reflective element is adjusted to provide the driver with an appropriate rearward field of view.

In one form, the alignment device comprises an illumination source positioned within a housing (typically cylindrical) closed with a cover, and with the light source disposed in or behind the housing so as to illuminate through the housing and/or cover. The housing may be positioned adjacent a perimeter of the reflective element or positioned behind the reflective element such that it is viewable by the driver through the reflective element (such as via a window opened in the mirror reflector coating). The housing preferably is colored, such as red or yellow, while the cover is also colored, but preferably with a different color, such as green. The cover color is visible to the driver when the mirror assembly is properly oriented relative to the driver to provide the appropriate rearward field of view. Preferably, the optimal viewing angle for that particular driver and that particular mirror element is provided when the cover color is visible to the driver, thus providing an optically-sighted mirror reflector alignment function.

In one preferred form, the rearview mirror assembly comprises an exterior rearview mirror assembly. In another preferred form, the rearview mirror assembly comprises an interior rearview mirror assembly.

These and other objects, advantages, purposes and features of this invention will become apparent upon review of the following specification in conjunction with the drawings.

BRIEF DESCRIPTION OF THE DRAWINGS

FIG. 6 is a top plan view of the interior rearview mirror assembly of FIG. 1, with a partial sectional view of an alignment device of the present invention.

DESCRIPTION OF THE PREFERRED EMBODIMENTS

Figure 1:
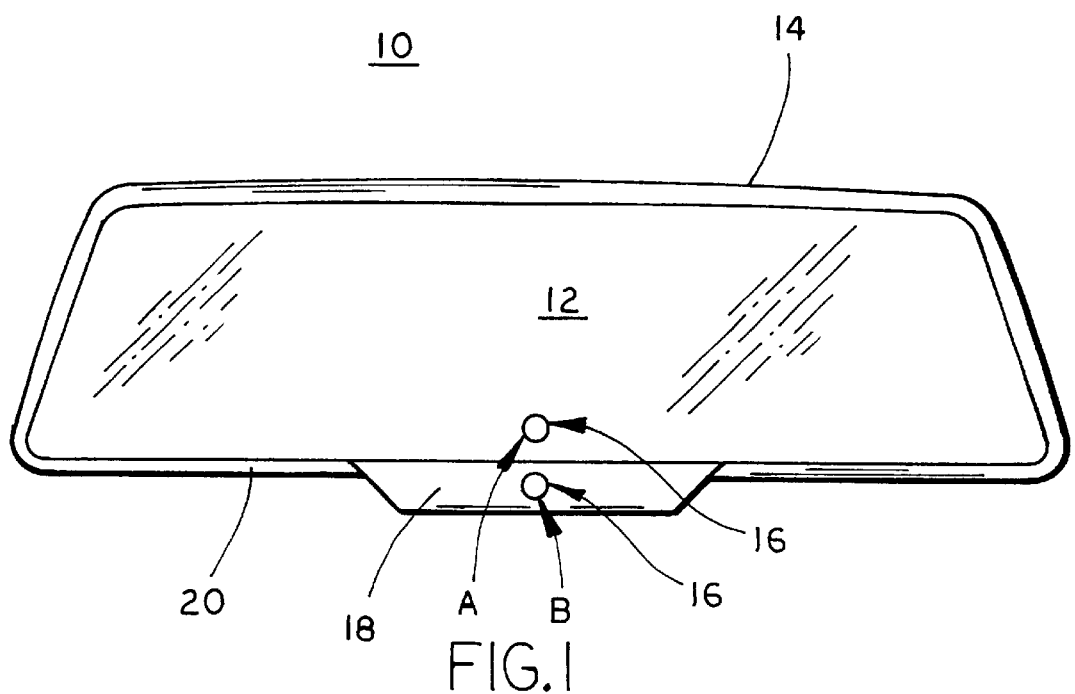
FIG. 1 is a rear elevation of an interior rearview mirror assembly in accordance with the present invention, viewed in a direction looking generally forwardly with respect to the vehicle.

Referring now specifically to the drawings and the illustrative embodiments depicted therein, an interior mirror assembly 10 for a vehicle comprises a reflective element 12, a casing, support or housing 14 and an alignment device 16 (FIGS. 1 and 6). Alignment device 16 is operable to provide a visible signal to a driver of the vehicle when the mirror assembly 10 is properly adjusted relative to the driver for a safe and optimal rearward field of view. Preferably, alignment device 16 provides an illumination signal of one or more colors, such that when a certain colored signal, such as green, is visible to the driver, then the mirror is in a proper orientation for safe and effective rearward viewing by the driver, as discussed in detail below.

Interior rearview mirror assembly 10 may be a prismatic mirror assembly, which is adjustable between a full reflectivity, day viewing position, and a reduced reflectivity, night viewing position, as is known in the art, or an electrochromic mirror assembly, which may be automatically adjustable to reduce the reflectivity of the mirror during nighttime conditions in order to reduce the glare from headlights of following vehicles, without affecting the scope of the present invention. Interior rearview mirror assembly 10 may be pivotally mounted to a mounting button 24, which is secured in a known fashion to the inside surface of a windshield 26 of the vehicle, via a mounting arm 28 (FIG. 6), or may be mounted to a headliner or console (not shown) at or along the ceiling of the vehicle, as is known in the art.

Alignment device 16 may be positioned at location A within casing 14 and behind reflective element 12, such that alignment device 16 is viewable by a driver of the vehicle through reflective element 12. Alignment device 16 may otherwise be placed elsewhere behind reflective element 12, without affecting the scope of the present invention. Reflective element 12 may include a partially reflective and/or transparent region for viewing alignment device 16 therethrough, or an opening, aperture, or deletion area on the reflective layer of reflective element 12 to allow visibility of alignment device 16 therethrough. Alternately, alignment device 16 may be positioned at location B in a chin area 18 of a bezel 20 of mirror assembly 10, without affecting the scope of the present invention. As shown in FIG. 6, alignment device 16 is mounted within interior rearview mirror assembly 10 at an angle relative to reflective element 12, such that when alignment device 16 is directly visible by and aligned with a driver of the vehicle, the reflective element 12 of the mirror assembly is properly oriented with respect to the driver and the vehicle to provide an optimal rearward field of view for that particular driver. Alignment device 16 is fixedly mounted such that it is angled toward the driver's side of the vehicle with respect to the reflective element of the mirror assembly. The angle of alignment device 16 may be laterally toward the driver's side and slightly downwardly with respect to reflective element 12, such that the reflective element may be tilted downward to provide alignment of alignment device 16 with the driver's line of sight.

Figure 2:
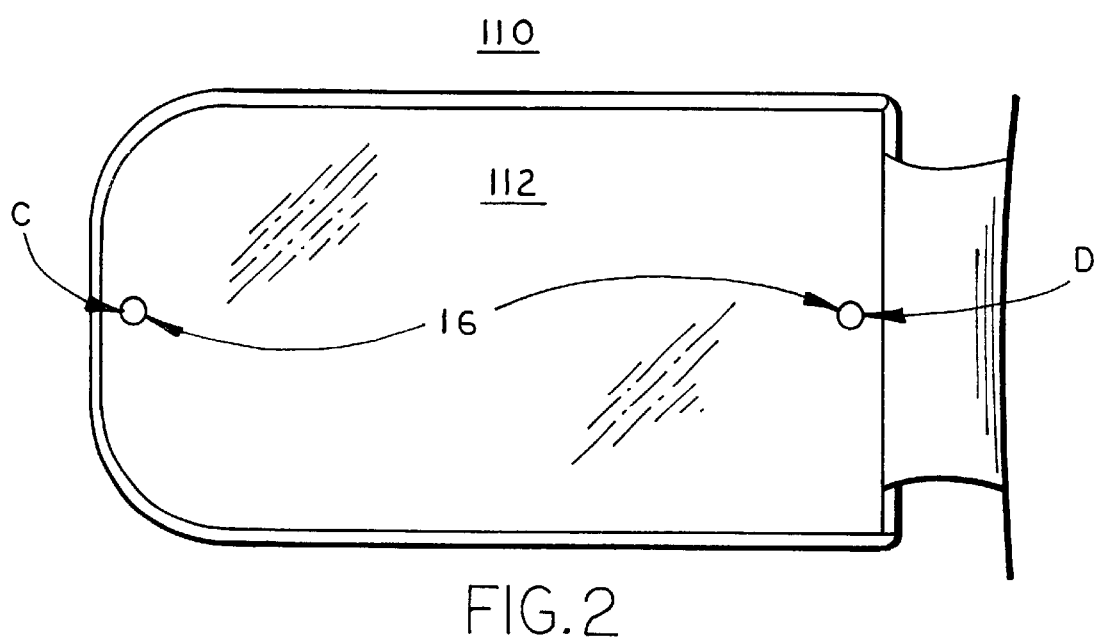
FIG. 2 is a rear elevation of an exterior rearview mirror assembly in accordance with the present invention, viewed in a direction looking generally forwardly with respect to the vehicle.
Figure 3:
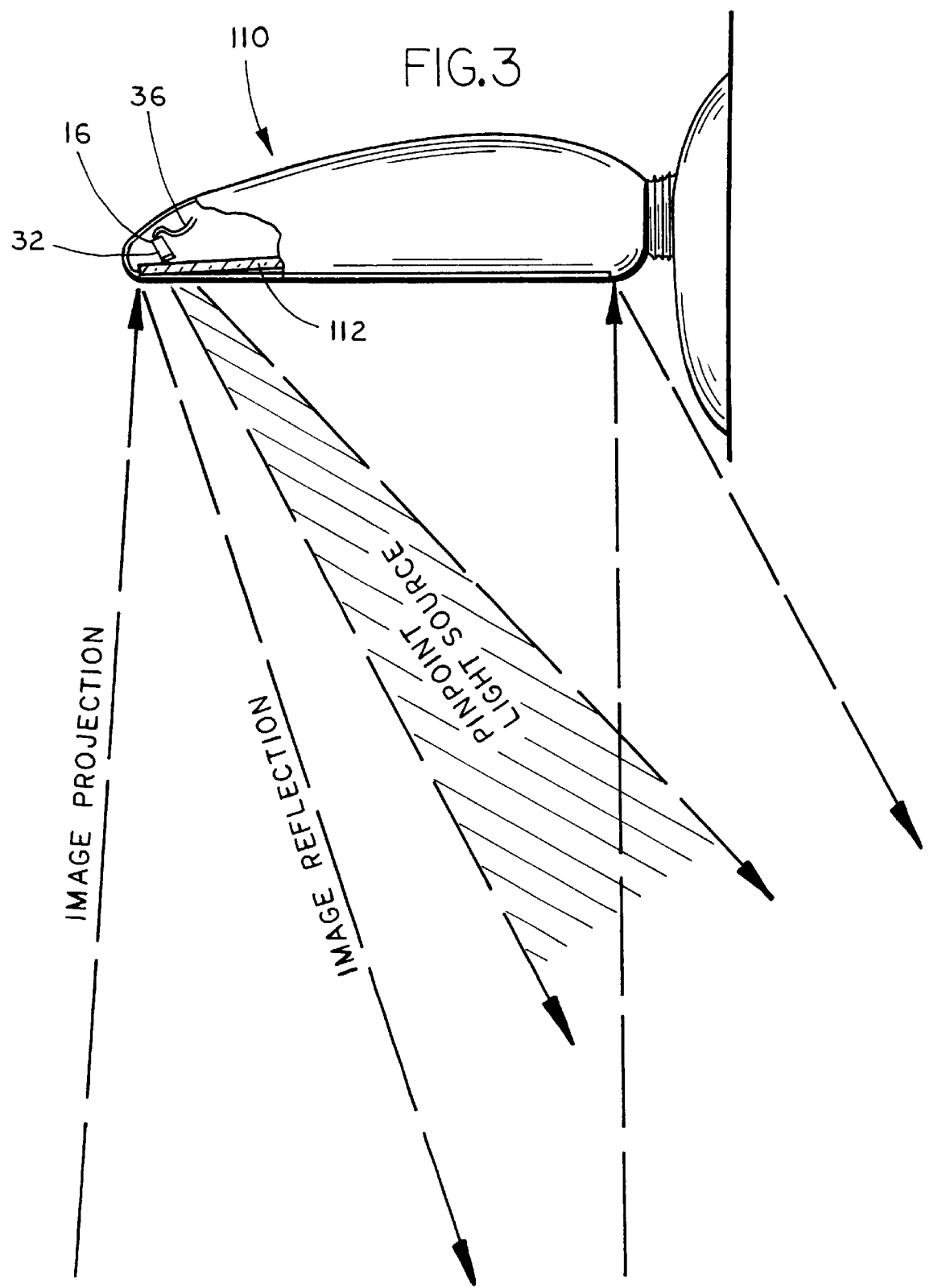
FIG. 3 is a top plan view of the exterior rearview mirror assembly of FIG. 2, with a partial sectional view of an alignment device of the present invention.

Additionally, as shown in FIGS. 2 and 3, alignment device 16 may be positioned at an exterior rearview mirror assembly 110, such as at or adjacent to an outer portion C of a reflective element 112 of exterior rearview mirror assembly 110. Alternately, alignment device 16 may be positioned at an inner portion D (FIG. 2), or anywhere else around a perimeter region, of the reflective element 112, without affecting the scope of the present invention. Similar to the alignment device of interior rearview mirror assembly 10, alignment device 16 of exterior mirror assembly 110 is fixedly secured relative to reflective element 112 at an appropriate angle, and is operable to provide a visible signal to the driver of the vehicle when reflective element 112 of exterior rearview mirror assembly 110 is properly adjusted relative to the driver for optimal rearward viewing by the driver. Alignment device 16 may be adapted for and positioned on one or both of the right and left side exterior rearview mirrors of the vehicle.

Exterior mirror assembly 110 may be configured with an electronic control to adjust the position of the reflective element via an electric actuator or positioning device (not shown) within the rearview mirror assembly 110. Examples of such electronic controls or actuators are disclosed in U.S. Pat. Nos. 5,900,999; 5,986,364; 6,094,027; 6,168,279; and 6,213,612, and U.S. patent application, Ser. No. 09/408,867, filed Sep. 29, 1999, now U.S. Pat. No. 6,243,218 (Attorney Docket No. DON01 P-771), the disclosures of which are hereby incorporated herein by reference. The driver, while seated normally in the driver's seat of the vehicle, then may adjust the reflective element 112 of exterior mirror assembly 110, such as via an electronic control, such as via a joystick, button or the like, until the correct or prescribed form of the visual indication is perceived by the driver. The visual indication may be in the form of a visible or illuminated indicia, such as a visible or illuminated circle or other shape, where only a portion of the circle or other shape is visible or illuminated when the reflective element is not properly adjusted, but where the circle or other shape is substantially fully visible or illuminated when the reflective element is properly adjusted. Alternately, the visible or illuminated indicia may be any other visible signal or indication, without affecting the scope of the present invention.

Thus, for example, the driver, sitting in the driver's seat, can look to view the exterior mirror reflector and, for example, by seeing only a half or other fractional circle of light, be made aware that the driver's side exterior mirror reflector is not optimally positioned to view the adjacent side lane blind spot for that particular model vehicle. The driver, utilizing a joystick or similar x-axis/y-axis control in the cabin, can then move the mirror reflector (via its actuator) so that the partial circle of light becomes a full or substantially full circle of light. Because of the geometries built into the assemblies of the present invention, correct alignment of the mirror reflector results in a substantially full circle of light being seen by the driver (irrespective of driver size and/or seating position). Thus, by adjusting the mirror reflector so as to see a substantially full circle of light, i.e., by completing the circle, the driver is guided towards the optimal position for the mirror reflector without any need to view a reference portion of the driver's side body panel of the vehicle in the reflector of the mirror reflective element. By providing a visual indication or signal to a driver when the reflective element is positioned for an appropriate field of view for the driver, the driver is less likely to position the reflective element to provide an inappropriate field of view, such as a field of view which includes a reference point along the side of the vehicle and which thus results in a blind spot laterally outward from the vehicle where other vehicles may be positioned when driving along a two lane road.

Figure 4:
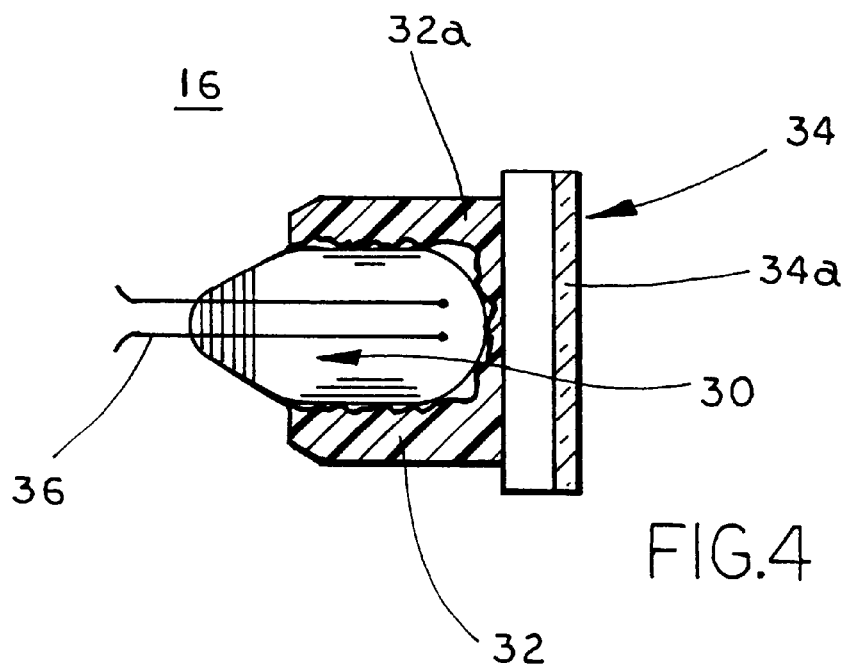
FIG. 4 is a sectional view of an alignment device in accordance with the present invention.

Referring now to FIG. 4, alignment device 16 comprises an illumination source 30, a housing 32 and a cover 34. An electrical wiring 36 is included to provide power and control of alignment device 16 via a vehicle wiring system (not shown). Preferably, illumination source 30 comprises a light-emitting source, such as an incandescent bulb, a white light emitting diode (LED), a fluorescent source, a luminescent source, a phosphorescent light source or the like. Illumination source 30 is positioned within housing 32, which may be a cylindrical tube-shaped housing with cover 34 secured at an outer end 32a thereof. Housing 32 may be semi-transparent and may have a color, such as yellow or red or any other color, such that light from illumination source 30 may be visible through housing 32 in a preselected wavelength as the color of the housing. Optionally, the intensity of the light source may be controlled in response to a photo-sensor or the like, such that the intensity of the light emitted from the light source is variable depending on the intensity of ambient light present at or within the vehicle. For example, the intensity of the light emitted from illumination source 30 may be increased when the ambient light level is bright, such as during daytime conditions, while the intensity of light emitted from illumination source 30 may be decreased or dimmed when the ambient light level is low, such as during evening or nighttime conditions.

Cover 34 is secured at outer end 32a of housing 32 and is semi-transparent to allow light from illumination source 30 to be projected therethrough. Preferably, cover 34 has a color which is different from housing 32, such as a green color. This effectively provides projection of a green dot toward the driver when the appropriate alignment is achieved. Preferably, cover 34 also includes a plurality of micro louvers or filters 34a, which function to direct the light projecting therethrough in a generally narrow column, thereby reducing dispersion of the light rays projecting through cover 34. This further channels the green light so as to make alignment device 16 more directional for finer alignment capability.

Figure 5:
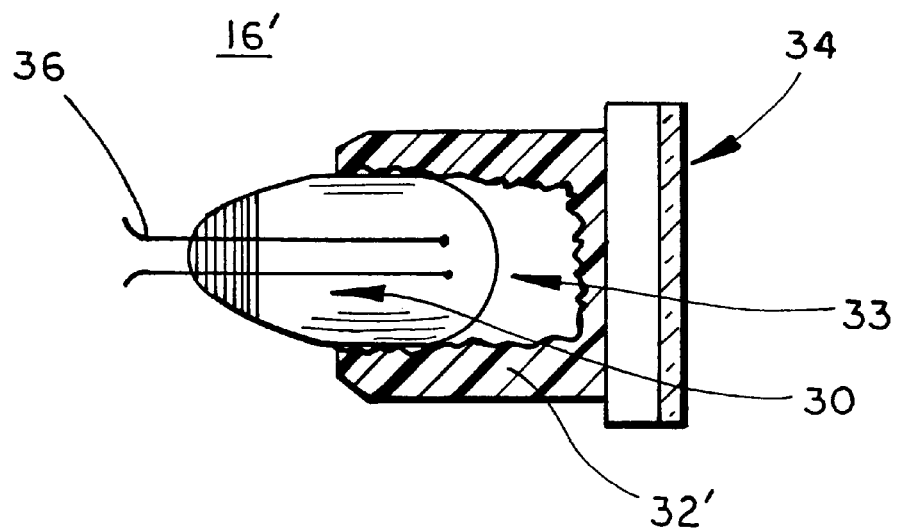
FIG. 5 is a sectional view of another alignment device of the present invention.

As shown in FIG. 5, an alignment device 16' may alternately include an elongated housing 32', which is operable to provide further channeling or directing of the light being projected from illumination source 30 along a light shaft 33 defined by housing 32', and thus providing a more finely tuned alignment of the reflective element of the mirror assembly.

As shown in FIGS. 3 and 6, alignment device 16 is positioned within its respective mirror assembly such that housing 32 is angled relative to the reflective surface 12, 112 of the mirror assembly 10, 110, respectively. The angle is selected such that when the housing 32 is longitudinally aligned with a driver's line of sight toward the mirror assembly, the mirror assembly is in its proper orientation to provide optimal rearward viewing to that particular driver for that particular mirror element. The mounting angle is selected based on the location of the mirror relative to the driver seat area and thus may vary depending on the mirror location on the vehicle.

Because alignment device 16 is fixed with respect to reflective element 12, as the reflective element of the mirror assembly is adjusted by the driver, the angle of the alignment device 16 is also adjusted with respect to the driver. Alignment device 16 is operable to provide illumination through the housing 32, such that the driver may see the yellow or red light at the mirror assembly, when the reflective element is not properly adjusted for that driver. The shape of the tube is such that when aligning the mirror, the color of the housing (such as yellow or red) is visible to the driver. A portion of the cover color (such as green) may also be visible as the adjustment approaches the proper alignment. When the reflective element is within a predetermined range of optimal adjustment for that particular driver, the green cover color will be clearly visible by the driver as a full green dot, with a minimal or no portion of the housing color being visible. This provides a visible indication or signal to the driver that the rearview mirror assembly is now properly adjusted. The alignment device thus provides a variable visible signal or indication to the driver, whereby the driver is thus aware when the mirror reflector is close to the appropriate orientation. Alternately, the housing may not be semi-transparent, such that the light from illumination source is only visible through cover 34, and thus only when the reflective element is approaching the appropriate orientation with respect to the driver.

As shown in FIGS. 3 and 6, the angle of the alignment device is not necessarily the same as the angle at which the images are reflected from the rearview mirrors. This is due to the various angles of the mirror and the eyes of the various drivers, which may vary significantly from one driver to another. The projected alignment angles are selected to provide proper adjustment for an optimal field of view for a wide variety of drivers. For example, an optimal field of view for an interior rearview mirror preferably includes the entire rear window aperture, while an optimal field of view for an exterior rearview mirror may include a minimal portion of a bumper at the respective side of the vehicle and the area laterally outwardly therefrom.

Preferably, alignment device 16 is only occasionally activated to provide the alignment signal to the driver only when the driver may need such a signal. For example, the illumination source may be activated in response to an activating event, such as activation of the vehicle ignition, detection of a movement of the mirror element, or detection of an occupant at the driver's seat, or detection of any other situation where adjustment of the mirror may then be expected. The illumination source remains activated for a period of time following activation, in order to provide sufficient time for the driver to adjust the mirror to the appropriate orientation. After a specified delay sequence, the illumination source may be deactivated such that the light is no longer visible to the driver during normal driving of the vehicle. Optionally, the illumination source may be initially operated with a timer which causes the illumination source to flash, in order to catch the driver's attention. After several seconds, the illumination source may switch from a flashing mode to a continuous, non-flashing mode for a period of time prior to deactivation of the illumination source. Alternately, the illumination source may remain continuously activated, such as when the vehicle ignition is on, such that the green dot is visible to the driver when the mirror is in proper alignment and the other color of the housing is visible, or no signal is visible, when there is need for alignment. Optionally, a lock-out device may be provided that reduces the opportunity to activate the alignment device when the vehicle is in motion or otherwise in a condition when adjustment of the mirror reflective element may not be desired. Such a lock-out device may be any known or conventional device.

In an alternate embodiment of the present invention, an alignment device may include a sighting lens and two illumination sources. Preferably, one illumination source is a green light emitting diode, while the other illumination source is a red light emitting diode. The sighting lens may be fixedly secured to an interior or exterior rearview mirror assembly at a fixed angle, similar to housing 32 and cover 34 of alignment device 16, discussed above, and between the red and green illumination sources. The angle of the alignment device relative to the reflective element is selected such that the angle of the sighting lens is aligned with the driver's line of sight when the mirror is properly adjusted. Additionally, the position of the sighting lens relative to the illumination sources is preferably selected such that when the sighting lens is viewed straight on, the color of the lens appears green, indicating proper alignment, while the color appears red if not viewed straight on, indicating the need for adjustment. Similar to alignment device 16, the illumination sources may be activated in response to an activating event, and may be deactivated after a period of time following activation.

The present invention thus provides a rearview mirror assembly or assemblies which include an alignment device for assisting a driver of a vehicle in achieving an optimal and safe orientation of the rearview mirrors of the vehicle. The alignment device provides a visible signal to the driver to alert the driver when the mirror may need adjustment and to convey to the driver that the mirror is properly adjusted. The alignment device may be activated in response to the driver turning on the vehicle's ignition, and may be deactivated a period of time following activation, such that the alignment device is not visible during normal driving of the vehicle. The alignment device thus provides a low cost device which facilitates easy adjustment of the mirrors when a new driver enters the vehicle. By assisting a new driver in achieving proper adjustment of the mirrors each time a new driver is in the vehicle, the likelihood of hazardous blind spots along the sides of the vehicle is substantially reduced.

Therefore, the present invention provides an optically-sighted mirror reflector alignment function, whereby a driver of the vehicle, while seated normally in the driver's seat of the vehicle, can adjust the orientation of the reflector to provide an appropriate field of view to the driver. Thus, for example, in the case of an exterior mirror assembly, the appropriate field of view position or orientation provides a view to the driver of the vehicle which is rearward and sideward of the vehicle and at least partially includes the blind spot areas along the side or sides of the vehicle. The appropriate field of view position or orientation of the mirror reflector thus does not need to include a side portion of the vehicle, in order to optimize the blind spot viewing by the driver of the vehicle.

The driver thus can obtain the appropriate field of view by joystick controlled maneuvering of the mirror reflector element position, guided by the visual indication provided and without the need to rely upon the image captured in the field of view in the mirror reflector. The driver may look only at the visual signal or indication from the mirror adjustment or alignment device and adjust the reflector, such as via an electronic control within the vehicle, such as a joystick or button or the like, based on a visual cue given by the visible signal or indication. The driver thus sets the reflector field of view without any necessity to focus on, and independent of, the rearward image viewable in the mirror reflector. This substantially reduces the likelihood that the driver will set the field of view to include a reference point along the side of the vehicle, and thus provides an improved field of view, which includes the blind spot area along the side of the vehicle and laterally away from the vehicle, to the driver.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. An exterior rearview mirror assembly for a vehicle comprising:
   an adjustably positionable reflective element;
   a support for said reflective element; and
   an optically-sighted mirror alignment device which is operable to provide visual confirmation to a driver of the vehicle when said reflective element is adjusted to provide the driver with an appropriate rearward field of view, said alignment device comprising an illumination source which is operable to provide a visible indication to the driver when said reflective element is adjusted to provide the appropriate field of view, wherein said illumination source is positioned within a housing having a first color and a cover having, a second color, such that said second color is visible to the driver when said mirror assembly is adjusted to provide the appropriate rearward field of view.

2. The rearview mirror assembly of claim 1, wherein said alignment device provides a variable visual indication to the driver, whereby the visual indication varies as said reflective element is adjusted toward the appropriate field of view.

3. The rearview mirror assembly of claim 1, wherein said cover further includes a plurality of filtering elements to focus the light from said illumination source in a direction generally toward a driver area of the vehicle.

4. The rearview mirror assembly of claim 1, wherein said housing comprises an elongated cylindrical tube.

5. The rearview mirror assembly of claim 4, wherein said illumination source comprises one of an incandescent source, a light emitting diode, a phosphorous source, a luminescent source and a fluorescent source.

6. The rearview mirror assembly of claim 4, wherein said illumination source comprises at least one light emitting diode.

7. The rearview mirror assembly of claim 1, wherein said illumination source is activated in response to an activating event.

8. The rearview mirror assembly of claim 7, wherein said illumination source is deactivated a period of time following said activating event.

9. The rearview mirror assembly of claim 7, wherein said activating event is one of actuation of an ignition of the vehicle, an adjustment of said mirror assembly, and a detection of a driver of the vehicle.

10. The rearview mirror assembly of claim 1, wherein said alignment device is positioned within a housing of said mirror assembly and behind said reflective element such that said alignment device is visible to the driver through said reflective element.

11. The rearview mirror assembly of claim 1, wherein said reflective element is electronically adjustable from within the vehicle by the driver of the vehicle.

12. An interior rearview mirror assembly for a vehicle comprising:
   a reflective element adjustably positionable with respect to a driver of the vehicle; and
   an alignment device which is operable to provide visual confirmation to the driver of the vehicle when said reflective element is adjusted to provide the driver with an appropriate rearward field of view, said alignment device comprising an illumination source which is operable to provide light visible to the driver when said reflective element is properly adjusted, wherein said illumination source is positioned within a housing having a first color and a cover having a second color, such that said second color is visible to the driver when said mirror assembly is adjusted to provide the appropriate rearward field of view.

13. The interior rearview mirror assembly of claim 12, wherein said illumination device comprises one of an incandescent source, a light emitting diode, a phosphorous source, a luminescent source and a fluorescent source.

14. The interior rearview mirror assembly of claim 12, wherein said illumination device comprises at least one light emitting diode.

15. The interior rearview mirror assembly of claim 12, wherein said illumination source is activated in response to an activating event.

16. The interior rearview mirror assembly of claim 15, wherein said illumination source is deactivated a period of time following said activating event.

17. The interior rearview mirror assembly of claim 15, wherein said activating event is one of actuation of an ignition of the vehicle, an adjustment of said mirror assembly, and a detection of a driver of the vehicle.

18. The interior rearview mirror assembly of claim 12, wherein said alignment device is positioned within a casing of said interior rearview mirror assembly and behind said reflective element such that said alignment device is visible to the driver through said reflective element.

19. The interior rearview mirror assembly of claim 12, wherein said alignment device is positioned at a casing of said interior rearview mirror assembly generally adjacent a perimeter edge of said reflective element.

20. An exterior rearview mirror assembly for a vehicle comprising:

a reflective element adjustably positionable with respect to a driver of the vehicle; and an alignment device having at least one illumination source, said alignment device being operable to provide visual confirmation to the driver of the vehicle when said reflective element is adjusted to provide the driver with an appropriate rearward field of view along a side of the vehicle, wherein said illumination source is positioned within a housing having a first color and a cover having a second color, such that said second color is visible to the driver when said mirror assembly is adjusted to provide the appropriate rearward field of view.

21. The exterior rearview mirror assembly of claim 20, wherein said illumination device comprises one of an incandescent source, a light emitting diode, a phosphorous source, a luminescent source and a fluorescent source.

22. The exterior rearview mirror assembly of claim 20, wherein said illumination device comprises at least one light emitting diode.

23. The exterior rearview mirror assembly of claim 20, wherein said illumination source is activated in response to an activating event.

24. The exterior rearview mirror assembly of claim 23, wherein said illumination source is deactivated a period of time following said activating event.

25. The exterior rearview mirror assembly of claim 23, wherein said activating event is one of actuation of an ignition of the vehicle, an adjustment of said mirror assembly, and a detection of a driver of the vehicle.

26. The exterior rearview mirror assembly of claim 20, wherein said alignment device is positioned within a casing of said mirror assembly and behind said reflective element such that said alignment device is visible to the driver through said reflective element.

27. The exterior rearview mirror assembly of claim 20, wherein said reflective element is electronically adjustable by the driver of the vehicle from within the vehicle.

28. The exterior rearview mirror assembly of claim 20, wherein said alignment device is operable to provide a variable visible signal to the driver as said reflective element is adjusted toward a position to provide the appropriate field of view to the driver of the vehicle.

* * * * *